(12) United States Patent
Oostdyk et al.

(10) Patent No.: US 10,749,280 B2
(45) Date of Patent: Aug. 18, 2020

(54) ANGULARLY ADJUSTABLE ELECTRIC POWER CONDUCTOR GROUNDING CLAMP SYSTEM AND ASSOCIATED METHODS

(71) Applicant: KAM Technologies, LLC, Rockledge, FL (US)

(72) Inventors: Mark Oostdyk, Cocoa, FL (US); Bradley Dunst, Christmas, FL (US); Christopher Meeks, Madison, NC (US)

(*) Notice: Subject to any disclaimer, the term of this patent is extended or adjusted under 35 U.S.C. 154(b) by 0 days.

(21) Appl. No.: 16/149,823

(22) Filed: Oct. 2, 2018

(65) Prior Publication Data
US 2020/0106196 A1    Apr. 2, 2020

(51) Int. Cl.
*H01R 43/00* (2006.01)
*H01R 4/40* (2006.01)
*H01R 4/66* (2006.01)

(52) U.S. Cl.
CPC ................ *H01R 4/40* (2013.01); *H01R 4/66* (2013.01); *H01R 43/00* (2013.01)

(58) Field of Classification Search
CPC . H01R 4/643; H01R 4/60; H01R 4/40; H01R 4/66; H01R 11/14; H01R 11/15; H01R 43/00
USPC ......................................... 439/92, 100, 477
See application file for complete search history.

(56) References Cited

U.S. PATENT DOCUMENTS

| | | | | |
|---|---|---|---|---|
| 2,508,778 A * | 5/1950 | Spears | ..................... | H02B 3/00 439/479 |
| 4,133,591 A * | 1/1979 | West | ..................... | H01R 11/15 439/479 |
| 4,846,725 A * | 7/1989 | Williams | ............... | H01R 11/15 439/479 |
| 5,556,299 A * | 9/1996 | Finke | ..................... | H01R 11/15 439/479 |
| 7,160,142 B2 * | 1/2007 | Hughes | .................. | H01R 11/14 439/478 |
| 8,517,776 B1 * | 8/2013 | Flojo | ..................... | H01R 4/646 439/108 |
| 10,283,882 B2 * | 5/2019 | Quaedvlieg | ............ | H01R 43/22 |

\* cited by examiner

*Primary Examiner* — Hien D Vu
(74) *Attorney, Agent, or Firm* — Mark Malek; Paul Ditmyer; Widerman Malek, PL

(57) ABSTRACT

The grounding clamp system is for use with an electrically insulated pole and for attachment to an electrical conductor in angled configurations. The grounding clamp system includes a clamping mechanism having an actuatable clamp and an associated ground conductor connector. An attachment coupler is configured to attach to the electrically insulated pole, and an angular adjustment mechanism is coupled between the clamping mechanism and the attachment coupler. The adjustment mechanism is configured to provide angular adjustment between the clamping mechanism and the attachment coupler in at least one axis while also transferring force to actuate the actuatable clamp when attaching the clamping mechanism to the electrical conductor at a selected angular position. The clamping mechanism is configured to create a path to pass ground fault current from the electrical conductor to a ground conductor coupled to the ground conductor connector without including the angular adjustment mechanism in the path.

20 Claims, 8 Drawing Sheets

ANGULARLY ADJUSTABLE ELECTRIC POWER CONDUCTOR GROUNDING CLAMP SYSTEM AND ASSOCIATED METHODS

FIELD OF THE INVENTION

The present invention relates to the field of power conductor grounding, and more specifically, to power conductor grounding clamps systems, devices and methods.

BACKGROUND

In the electric power industry there is a need to ground the electrical conductor (i.e. cables, wires, conduit and electrical busses) after de-energizing and before performing work. Grounding the electrical conductor brings it to the same potential as the worker and in the event of an accidental circuit re-energization would bring all the potential to ground, thus protecting the worker. Currently, several clamps are available on the market that are installed using an electrically insulated pole (i.e. hot stick or shotgun stick) on typically a horizontal conductor. In addition, there are a few angle adjustable angle clamps on the market, but they have a very limited range of motion and are limited for use on very specific conductor geometries. Of these, none offer an acceptable fault current rating (e.g., 6 H or higher) because of their design issues, for example, that include various components in the path for passing ground fault current.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

With the above in mind, embodiments of the present invention are related to systems, devices and methods for grounding an electrical conductor with an angularly adjustable clamp that offers versatility with reliable attachment at various angles and an acceptable current rating (e.g. of at least 6 H).

An embodiment is directed to a grounding clamp system for use with an electrically insulated pole and for attachment to an electrical conductor in angled configurations. The grounding clamp system includes a clamping mechanism including an actuatable clamp and an associated ground conductor connector. An attachment coupler is configured to attach to the electrically insulated pole, and an angular adjustment mechanism is coupled between the clamping mechanism and the attachment coupler, and configured to provide angular adjustment between the clamping mechanism and the attachment coupler in at least one axis while also transferring force to actuate the actuatable clamp when attaching the clamping mechanism to the electrical conductor at a selected angular position. The clamping mechanism is configured to create a path to pass ground fault current from the electrical conductor to a ground conductor coupled to the ground conductor connector without including the angular adjustment mechanism in the path.

Additionally, and/or alternatively, the clamping mechanism further includes an actuator coupled to the actuatable clamp, wherein the angular adjustment mechanism is configured to transfer force between the attachment coupler and the actuator to actuate the actuatable clamp when attaching the clamping mechanism to the electrical conductor at the selected angular position.

Additionally, and/or alternatively, wherein the angular adjustment mechanism includes a rotational coupler configured to rotationally couple the adjustment mechanism to the clamping mechanism, and the rotational coupler is configured to provide rotational adjustment between the clamping mechanism and the adjustment mechanism around a second axis.

Additionally, and/or alternatively, the rotational coupler includes a rotational lock configured to lock the clamping mechanism in a selected position around the second axis.

Additionally, and/or alternatively, the actuator includes a threaded shaft.

Additionally, and/or alternatively, the actuatable clamp has a clamp body defining an upper jaw, and carrying a movable lower jaw coupled to the threaded shaft.

Additionally, and/or alternatively, the threaded shaft is positioned within the clamp body.

Additionally, and/or alternatively, the associated ground conductor connector includes an associated ground conductor threaded bore and an associated ground conductor fastener on the clamp body.

Additionally, and/or alternatively, the angular adjustment mechanism further includes an angular lock configured to lock the angular adjustment mechanism in the selected angular position.

Additionally, and/or alternatively, the angular adjustment mechanism includes a gear box and associated gears to provide the angular adjustment between the clamping mechanism and the attachment coupler in the at least one axis while also transferring force to actuate the actuatable clamp.

Additionally, and/or alternatively, the angular adjustment mechanism includes at least one universal joint to provide the transfer of force to actuate the actuatable clamp.

Additionally, and/or alternatively, the angular adjustment mechanism includes a hydraulic actuator to provide the transfer of force to actuate the actuatable clamp.

An embodiment is also directed to an angular adjustment mechanism for use with a grounding clamp system configured to be securely attached to an electrical conductor in angled configurations to create a path to pass ground fault current from the electrical conductor to a ground conductor, the grounding clamp system including a clamping mechanism having an actuatable clamp and an associated ground conductor connector. The angular adjustment mechanism includes an angle selection unit configured to provide angular adjustment between the clamping mechanism and an electrically insulated pole in a first axis while also transferring force to actuate the actuatable clamp when attaching the clamping mechanism to the electrical conductor at a selected angular position. An angle lock is configured to lock the angle selection unit at the selected angular position. An upper rotational coupler is configured to rotationally couple the angle selection unit to the clamping mechanism around a second axis substantially perpendicular to the first axis, and a lower coupler is configured to couple the angle selection unit to an electrically insulated pole. The angular adjustment mechanism is out of the path to pass ground fault current from the electrical conductor to the ground conductor coupled to the ground conductor connector.

Additionally, and/or alternatively, the upper rotational coupler includes a rotational lock configured to lock the clamping mechanism in a selected position around the second axis.

Additionally, and/or alternatively, the angular adjustment mechanism includes a gear box and associated gears to provide the angular adjustment between the clamping mechanism and the insulated pole in the first axis while also transferring force to actuate the actuatable clamp.

Additionally, and/or alternatively, the angular adjustment mechanism includes at least one universal joint to provide the transfer of force to actuate the actuatable clamp.

Additionally, and/or alternatively, the angular adjustment mechanism includes a hydraulic actuator to provide the transfer of force to actuate the actuatable clamp.

An embodiment is also directed to a method of making a grounding clamp system for use with an electrically insulated pole and for attachment to an electrical conductor in angled configurations. The method includes; providing a clamping mechanism including an actuatable clamp having an actuator and an associated ground conductor connector; providing an attachment coupler configured to attach to the electrically insulated pole; and rotationally coupling an angular adjustment mechanism between the clamping mechanism and the attachment coupler, the angular adjustment mechanism configured to provide angular adjustment between the clamping mechanism and the attachment coupler in at least one axis while also transferring force to the actuator to actuate the actuatable clamp when attaching the clamping mechanism to the electrical conductor at a selected angular position. The clamping mechanism is configured to create a path to pass ground fault current from the electrical conductor to a ground conductor coupled to the ground conductor connector without including the angular adjustment mechanism in the path.

Additionally, and/or alternatively, the actuator includes a threaded shaft, and the actuatable clamp includes a clamp body defining an upper jaw, and carrying a movable lower jaw coupled to the threaded shaft, wherein the threaded shaft is positioned within the clamp body.

Additionally, and/or alternatively, the angular adjustment mechanism includes a gear box and associated gears to provide the angular adjustment between the clamping mechanism and the attachment coupler in the at least one axis while also transferring force to actuate the actuatable clamp.

So, the embodiments of the invention can be used for grounding an electrical conductor with a clamp that offers angular adjustability, creates a path to pass ground fault current from the electrical conductor to a ground conductor without including the angular adjustment mechanism in the path, and preferably results in a current rating of at least 6 H.

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Generally, the proposed embodiments of the invention include the use of a grounding clamp that offers the ability to attach to an electrical conductor in any geometric configuration using the same clamping device. For example, attachment may be possible to any electrical conductor (to include but not limited to cable, wire, conduit, pipe, support or bus) in a vertical, horizontal and any geometric configuration in between, and also in any direction using the same clamping device. The mechanism providing the angular and direction adjustment is positioned out of the ground fault current path for grounding, thus making certification less complex, design more effective, safer and less prone to failure. The apparatus is designed such that the clamp portion will carry the current in a ground fault, and the current path will not include the angle adjusting mechanism. This will allow the apparatus to meet a 6 H current rating or higher, for example. The clamp system may reduce maintenance issues that are typical of existing approaches by positioning a threaded support rod within the clamp body to protect the component.

The angle adjustment mechanism may be adjusted from 0 to 180 degrees in one axis and a full 360 degrees on a 2nd axis, for example. Alternate configurations could have more or less adjustment along the first axis, less adjustment along the second axis, or could include a fixed angular position on one or both axes. A first angular adjustment axis could be about the y axis from 0-180 degrees and any angle in between, for example. A second angular adjustment axis could be about the z axis in a full 360 degrees and any angle in between, for example. Both of these angular adjustments can be adjusted independently thus making any variation or configuration selection over the two axes possible. Once adjusted to the selected position, both axes may be locked. Once locked, the clamp, e.g. at the distal end of an insulating pole, can be closed or opened without disturbing the selected position.

Figure 1:
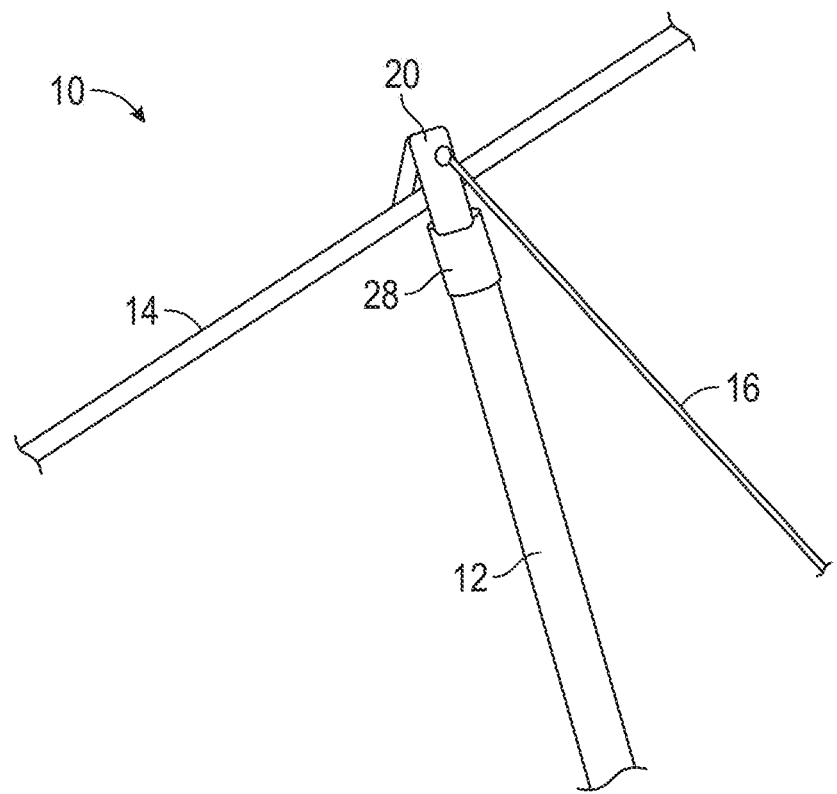
FIG. 1 is a schematic illustration of a grounding clamp system and an electrically insulated pole attached to an electrical conductor according to features of an embodiment of the present invention.

With reference to FIGS. 1-7, the system, device and method in accordance with features of the present embodiments will be described. The embodiments of the invention can be used for grounding an electrical conductor with a clamp that offers angular adjustability, creates a path to pass ground fault current from the electrical conductor to a ground conductor without including the angular adjustment mechanism in the path, and preferably results in a current rating of at least 6 H. For example, see ASTM F855-17, Standard Specifications for Temporary Protective Grounds to Be Used on De-energized Electric Power Lines and Equipment, ASTM International, West Conshohocken, Pa., 2017, www.astm.org. These specifications cover the equipment making up the temporary grounding system used on de-energized electric power lines, electric supply stations, and equipment. These specifications for a system of protective grounding utilizing copper cables are covered in four parts, as follows: clamps, ferrules, cables, and temporary protective grounds. The clamps shall be subject to design tests for determining mechanical torque strength and electrical short circuit capacity. Clamps are furnished in grades according to mechanical strengths, short circuit capabilities, and duration of faults, as indicated in Table 1 or Table 2 therein (See Table 2 Ultimate Assembly Rating for High X/R Ratio Applications), FIG. 1 is a schematic illustration of a grounding clamp system 10 and an electrically insulated pole 12 attached to an electrical conductor 14 according to features of an embodiment of the present invention. When working in the electric power industry, it is recommended or required to ground the electrical conductor 14 (e.g., cable, wire, conduit and/or electrical bus) after cutting power and before performing work. As discussed above, grounding the electrical conductor 14 brings it to the same potential as the worker and in the event of an accidental circuit re-energization would bring all the potential to ground, thus protecting the worker. Typical clamps are installed using the electrically insulated pole 12 (i.e. hot stick or shotgun stick), as would be appreciated by those skilled in the art.

Figure 2:
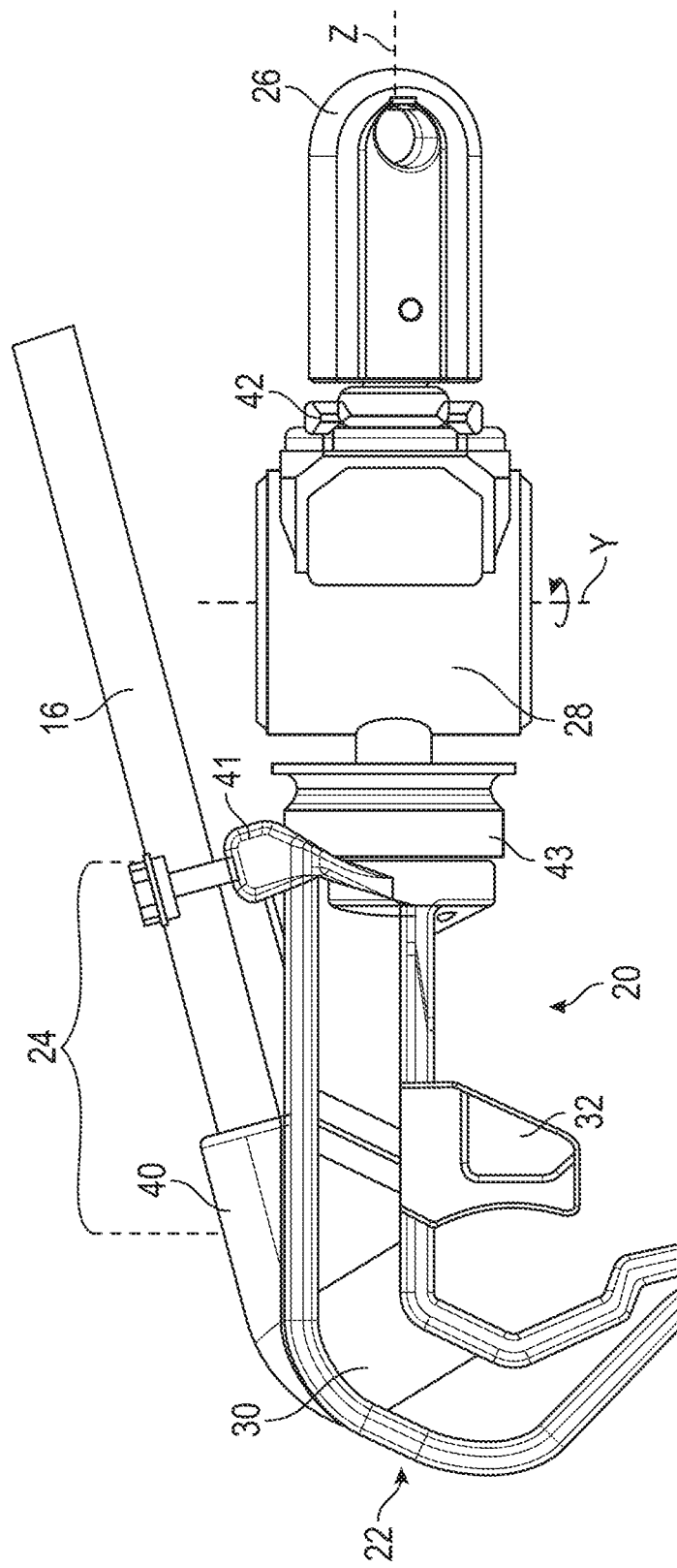
FIG. 2 is a side view of a grounding clamp used in the system of FIG. 1.

The grounding clamp system 10 of the present embodiments is for use with an electrically insulated pole 12 and for attachment to electrical conductor 14 in angled configurations. The grounding clamp system 10 includes a clamping mechanism 20 having an actuatable clamp 22. As illustrated in the embodiment of FIGS. 2-4, the grounding clamp system 10 includes a C-type clamp as the actuatable clamp 22, for example. Other types of actuatable clamps are also contemplated if they provide the capability to be reliably actuated or adjusted to attach to the electrical conductor 14. Here, as a C-type clamp, the actuatable clamp 22 has a clamp body 30 defining an upper jaw. The clamp body 30 carries a movable lower jaw 32. An actuator, such as a threaded shaft 36 (e.g., a lead screw or ACME screw) is positioned within the clamp body 30, for example, to protect the component from damage. The movable lower jaw 32 is coupled to the threaded shaft 36. e.g., via a floating arrangement using a guide 38 and coupling plate 39 so that the lower jaw 32 does not directly interface with the threaded shaft 36. This arrangement reduces the threaded shaft 36 being used as a current path.

The clamp body 30 may be made of aluminum, for example. The lower jaw 32 may be made of aluminum, for example. The threaded shaft 36 is preferably made of stainless steel, while the coupling plate 39 is made of relatively stronger aluminum (e.g. 7075 aluminum), for example. Other materials are contemplated such as carbon steel, stainless steel, brass, nickel alloy and aluminum alloy. Higher quality metals may reduce the risk of cracking, rusting and other damage. Other components within the system 10 may include insulative and/or conductive polymers, fiberglass, plastics, etc.

The clamping mechanism 20 includes an associated ground conductor connector 24. The ground conductor connector 24 includes an associated ground conductor threaded bore 40 and an associated ground conductor fastener 41 on the clamp body. The fastener 41 may be a collar having one or more associated screws or bolts to secure the ground conductor 16 to the clamp body 30.

An attachment coupler 26 is configured to attach to the electrically insulated pole 12. An angular adjustment mechanism 28 is coupled between the clamping mechanism 20 and the attachment coupler 26. As illustrated, the attachment coupler 26 is rotationally coupled, via collar 42 to the angular adjustment mechanism 28. As illustrated, the attachment coupler 26 includes an eye for connection to the electrically insulated pole 12 but other arrangements are possible as would be appreciated by those skilled in the art. The pole 12 is rotated and torque energy is provided via the attachment coupler 26 and the angular adjustment mechanism 28 to actuate the actuatable clamp 22. In other words, in the illustrated embodiment, the torque is transferred via the threaded shaft 36 to the lower jaw 32 to tighten or loosen the actuatable clamp 22.

The angular adjustment mechanism 28 is configured to provide angular adjustment between the clamping mechanism 20 and the attachment coupler 26 and/or insulated pole 12, in an axis Y while also transferring force to actuate the actuatable clamp 22 when attaching the clamping mechanism 20 to the electrical conductor 14 at a selected angular position.

Figure 3A:
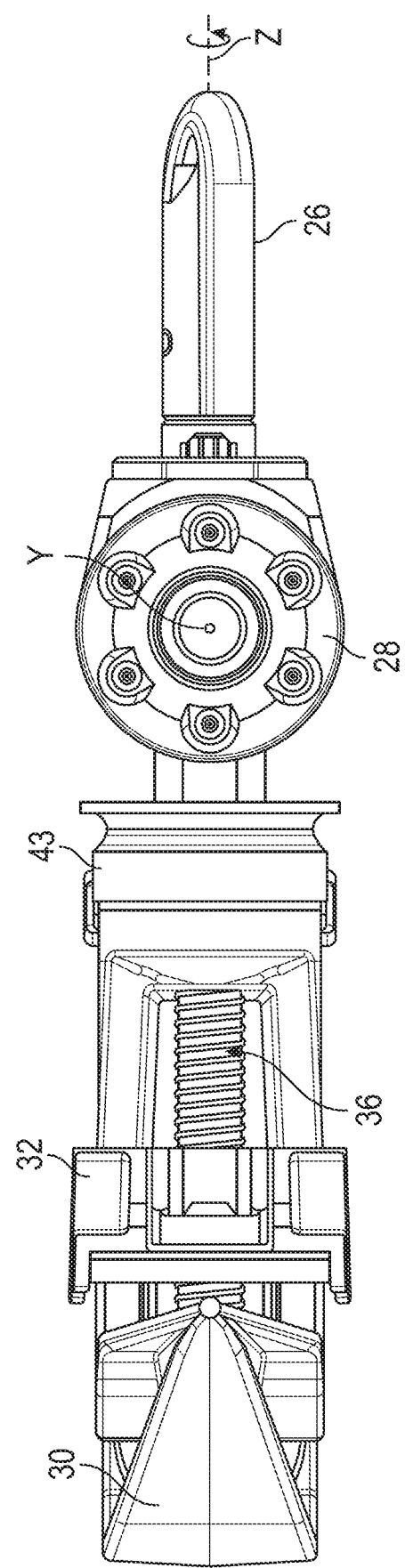
FIG. 3A is a front view of the grounding clamp of FIG. 2.
Figure 3B:
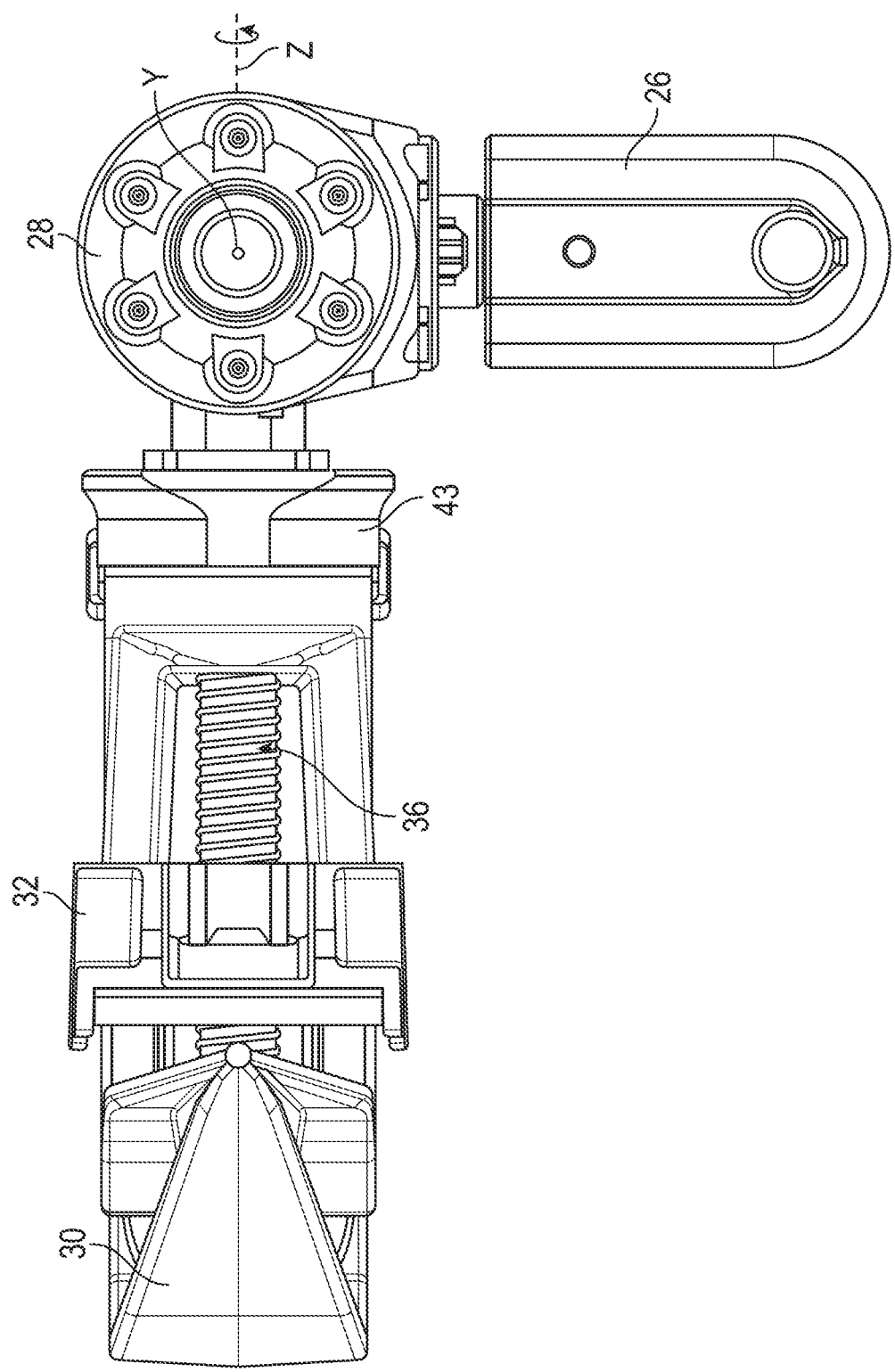
FIG. 3B is a front view of the grounding clamp of FIG. 2 with an angular adjustment of 90 degrees on the Y axis.
Figure 4:
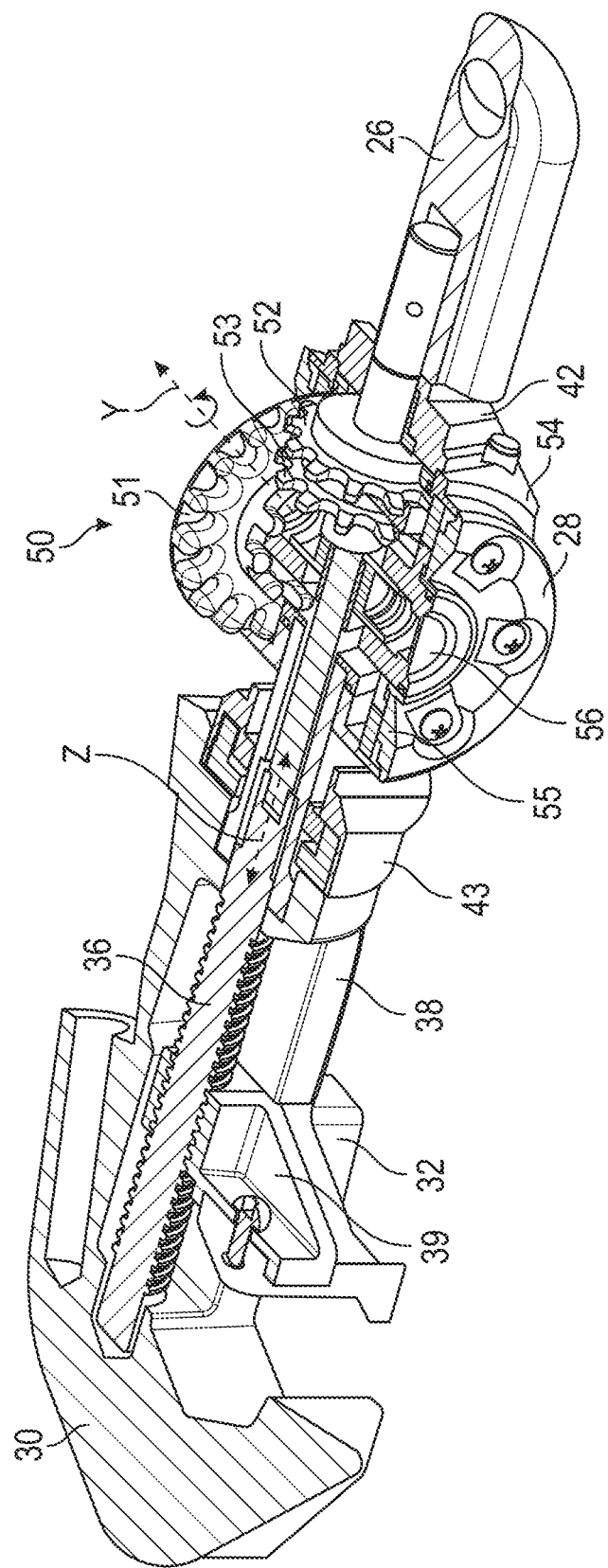
FIG. 4 is a perspective cutaway view illustrating details of the grounding clamp of FIG. 2.

FIG. 3A is a front view of the grounding clamp of FIG. 2. FIG. 3B is a front view of the grounding clamp of FIG. 2 with an angular adjustment of 90 degrees on the Y axis. As illustrated in FIGS. 2-4, the angular adjustment mechanism 28 defines an articulating torque-transfer device and includes a gear box 50 and associated gears such as a double profile idler gear 51, input gear 52, and output gear 53, arranged as shown, to provide the angular adjustment between the clamping mechanism 20 and the attachment coupler 26 in the axis Y while also transferring force to actuate the actuatable clamp 22. As discussed above, the selectable angular adjustment about the Y axis may include a range of 0-90 degrees or 0-180 degrees, for example. Other ranges are contemplated. The gear box 50 may include an outer housing 54 and inner housing 55 to carry the gear arrangement. The angular adjustment mechanism 28 may further include an angular lock 56 configured to lock the angular adjustment mechanism 28 in the selected angular position. The angular lock 56 may be a spring-loaded push button lock, for example, as illustrated.

A rotational coupler 43 may be included and configured to rotationally couple the angular adjustment mechanism 28 to the clamping mechanism 20. As illustrated, the rotational coupler 43 may include a spring-loaded collar and be mounted to the clamp body 30 at a lower end thereof. The rotational coupler 43 is configured to provide rotational adjustment between the clamping mechanism 20 and the angular adjustment mechanism around a second axis Z. As discussed above, such rotational adjustment may include a range of 0-360 degrees, for example. Other ranges are contemplated. The spring-loaded collar of the rotational coupler 43 may define a rotational lock configured to lock the clamping mechanism 20 in a selected position around the second axis Z.

In accordance with the features described above, the clamping mechanism 20 with the associated ground conductor connector 24 is configured to create a path to pass ground fault current, from the electrical conductor 14 to the ground conductor 16 coupled to the ground conductor connector 24, without including the angular adjustment mechanism 28 in the path. This clamping mechanism 20 can be positioned or attached on a variety of electrical conductor geometric configurations using the insulated pole 12 with angular adjustment mechanism with the angular adjustment mechanism 28 described. The angular adjustment mechanism 28 is protected by being positioned out of the electrical current path for grounding, thus making certification less complex, design more effective, and the system safer and less prone to failure.

Figure 5:
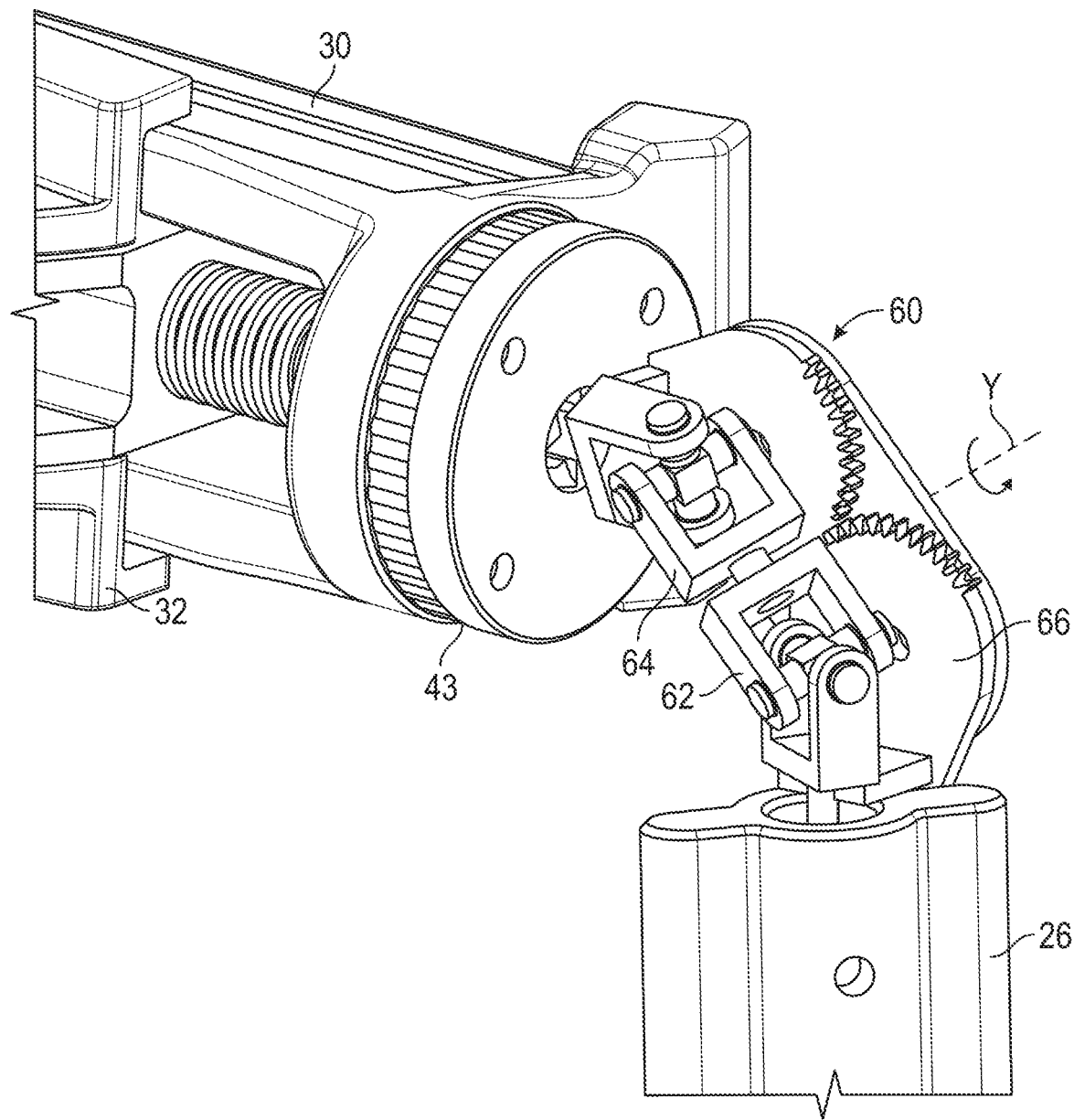
FIG. 5 is a perspective sectional view illustrating details of another embodiment of the grounding clamp, including universal joints, used in the system of FIG. 1.

Another embodiment of the angular adjustment mechanism 28 is illustrated in FIG. 5 which is a perspective sectional view illustrating details of the angular adjustment mechanism 28 used in the system 10 of FIG. 1. Here, the angular adjustment mechanism 28 defines an articulating torque-transfer device and includes a joint arrangement 60 having universal joints 62, 64 and associated gears 66 arranged as shown, to provide the angular adjustment between the clamping mechanism 20 and the attachment coupler 26 in the axis Y while also transferring force to actuate the actuatable clamp 22. As discussed above, the selectable angular adjustment about the Y axis may include a range of 0-90 degrees or 0-180 degrees, for example. Other ranges are contemplated.

Figure 6:
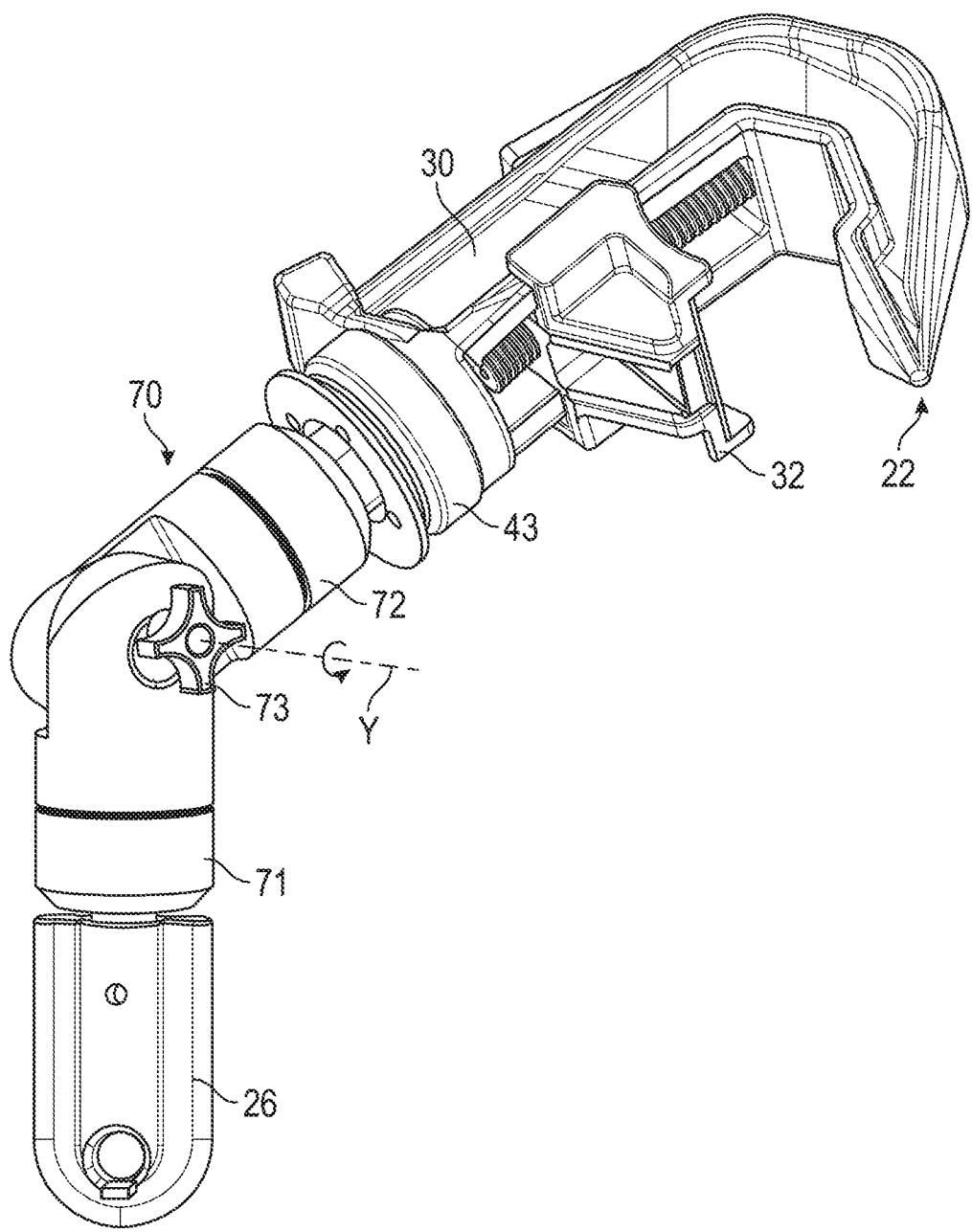
FIG. 6 a perspective view illustrating details of another embodiment of the grounding clamp, including hydraulic coupling, used in the system of FIG. 1.

Another embodiment of the angular adjustment mechanism 28 is illustrated in FIG. 6 which is a perspective sectional view illustrating details of the angular adjustment mechanism 28 used in the system 10 of FIG. 1. Here, the angular adjustment mechanism 28 defines an articulating torque-transfer device and includes a hydraulic arrangement 70, or hydraulic actuator, having hydraulic cylinder devices 72, 74 and associated angle lock 73 arranged as shown, to provide the angular adjustment between the clamping mechanism 20 and the attachment coupler 26 in the axis Y while also transferring force to actuate the actuatable clamp 22. As discussed above, the selectable angular adjustment about the Y axis may include a range of 0-90 degrees or 0-180 degrees, for example. Other ranges are contemplated.

Figure 7:
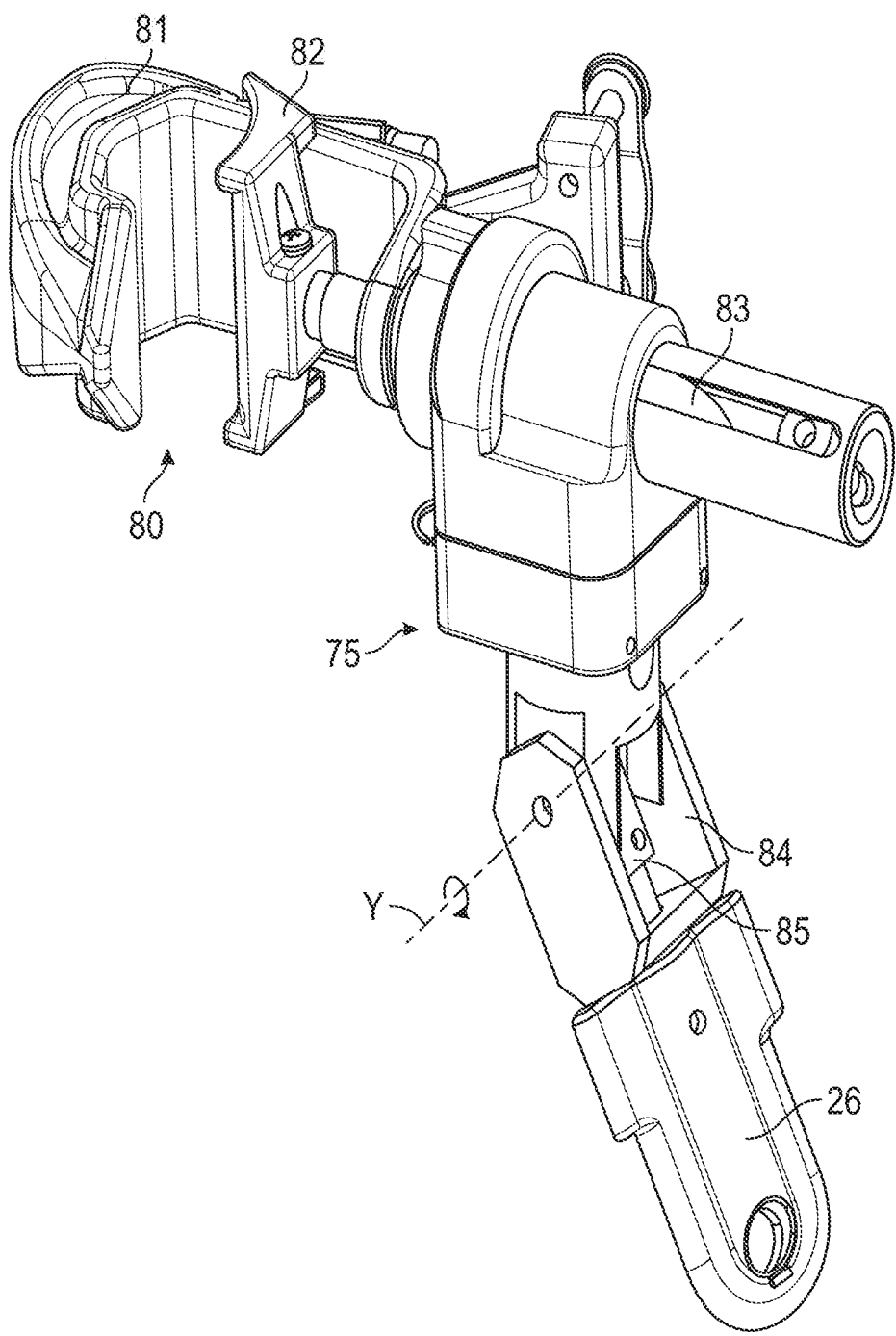
FIG. 7 a perspective view illustrating details of another embodiment of the grounding clamp used in the system of FIG. 1.

FIG. 7 a perspective view illustrating details of another embodiment of the grounding clamp arrangement 75 used in the system of FIG. 1. Here, the ground clamp 80 may be a typical off-the-shelf C-clamp having an upper jaw 81 and a movable lower jaw 82 that is driven by an eye bolt 83. The attachment coupler 26 is attached between the insulated pole 12 and the clamp 80 with an angle selection unit 84 configured to provide angular adjustment between the clamp 80 and the electrically insulated pole 12 in the first axis Y while also transferring force, e.g. torque via joint 85 to actuate the clamp 80 when attaching it to the electrical conductor 14 at a selected angular position. The ground clamp arrangement 75 includes a torque transfer box 86 that is positioned over the eye bolt 83 and transfers rotational force from the insulated pole 12 to the eye bolt via the joint 85 to actuate the clamp lower jaw 82.

An embodiment is also directed to a method of making a grounding clamp system 10 for use with an electrically insulated pole 12 and for attachment to an electrical conductor 14 in angled configurations. The method includes; providing a clamping mechanism 20 including an actuatable clamp 22 having an actuator or threaded shaft 36 and an associated ground conductor connector 24; providing an attachment coupler 26 configured to attach to the electrically insulated pole 12; and rotationally coupling an angular adjustment mechanism 28 between the clamping mechanism 20 and the attachment coupler 26 to provide angular adjustment between the clamping mechanism 20 and the attachment coupler 26 in at least one axis Y while also transferring force to the actuator 36 to actuate the actuatable clamp 22 when attaching the clamping mechanism 20 to the electrical conductor 14 at a selected angular position. The clamping mechanism 20 is configured to create a path to pass ground fault current from the electrical conductor 14 to a ground conductor 16 coupled to the ground conductor connector 24 without including the angular adjustment mechanism 28 in the path.

This method results in a clamping mechanism 20 that can be positioned or attached on a variety of electrical conductor geometric configurations using the insulated pole 12 with angular adjustment mechanism with the angular adjustment mechanism 28 described. The angular adjustment mechanism 28 is protected by being positioned out of the electrical current path for grounding, thus making certification less complex, design more effective, and the system safer and less prone to failure.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

The above description provides specific details, such as material types and processing conditions to provide a thorough description of example embodiments. However, a person of ordinary skill in the art would understand that the embodiments may be practiced without using these specific details.

Some of the illustrative aspects of the present invention may be advantageous in solving the problems herein described and other problems not discussed which are discoverable by a skilled artisan. While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item. Thus, the scope of the invention should be determined by the appended claims and their legal equivalents, and not by the examples given.

That which is claimed is:

1. A grounding clamp system for use with an electrically insulated pole and for attachment to an electrical conductor in angled configurations, the grounding clamp system comprising:
   a clamping mechanism including an actuatable clamp and an associated ground conductor connector, the actuatable clamp includes a moveable clamp member being actuatable in a direction along an actuating axis to selectively tighten and loosen the clamping mechanism on the electrical conductor;
   an attachment coupler configured to attach to the electrically insulated pole; and
   an angular adjustment mechanism coupled between the clamping mechanism and the attachment coupler, and configured to provide angular adjustment between the clamping mechanism and the attachment coupler in at least one angular adjustment axis that is transverse to the actuating axis, while also transferring force to actuate the actuatable clamp in the direction along the actuating axis when attaching the clamping mechanism to the electrical conductor at a selected angular position;
   wherein the clamping mechanism is configured to create a path to pass ground fault current from the electrical conductor to a ground conductor coupled to the associated ground conductor connector without including the angular adjustment mechanism in the path.

2. The grounding clamp system according to claim 1, wherein the clamping mechanism further includes an actuator coupled to the actuatable clamp; wherein the angular adjustment mechanism is configured to transfer force between the attachment coupler and the actuator to actuate the actuatable clamp when attaching the clamping mechanism to the electrical conductor at the selected angular position.

3. The grounding clamp system according to claim 2, wherein the angular adjustment mechanism comprises a rotational coupler configured to rotationally couple the adjustment mechanism to the clamping mechanism, and the rotational coupler is configured to provide rotational adjustment between the clamping mechanism and the adjustment mechanism around a second axis.

4. The grounding clamp system according to claim 3, wherein the rotational coupler includes a rotational lock configured to lock the clamping mechanism in a selected position around the second axis.

5. The grounding clamp system according to claim 2, wherein the actuator comprises a threaded shaft.

6. The grounding clamp system according to claim 5, wherein the actuatable clamp comprises a clamp body defining an upper jaw, and carrying the moveable clamp member as a movable lower jaw coupled to the threaded shaft.

7. The grounding clamp system according to claim 6, wherein the threaded shaft is positioned within the clamp body.

8. The grounding clamp system according to claim 6, wherein the associated ground conductor connector comprises an associated ground conductor threaded bore and an associated ground conductor fastener on the clamp body.

9. The grounding clamp system according to claim 1, wherein the angular adjustment mechanism further comprises an angular lock configured to lock the angular adjustment mechanism in the selected angular position.

10. The grounding clamp system according to claim 1, wherein the angular adjustment mechanism comprises a gear box and associated gears to provide the angular adjustment between the clamping mechanism and the attachment coupler in the at least one axis while also transferring force to actuate the actuatable clamp.

11. The grounding clamp system according to claim 1, wherein the angular adjustment mechanism comprises at least one universal joint to provide the transfer of force to actuate the actuatable clamp.

12. The grounding clamp system according to claim 1, wherein the angular adjustment mechanism comprises a hydraulic actuator to provide the transfer of force to actuate the actuatable clamp.

13. An angular adjustment mechanism for use with a grounding clamp system configured to be securely attached to an electrical conductor in angled configurations to create a path to pass ground fault current from the electrical conductor to a ground conductor, the grounding clamp system including a clamping mechanism having an actuatable clamp and an associated ground conductor connector, the angular adjustment mechanism comprising:
   an angle selection unit configured to provide angular adjustment between the clamping mechanism and an electrically insulated pole in a first axis while also transferring force to actuate the actuatable clamp when attaching the clamping mechanism to the electrical conductor at a selected angular position;
   an angle lock configured to lock the angle selection unit at the selected angular position;
   an upper rotational coupler configured to rotationally couple the angle selection unit to the clamping mechanism around a second axis substantially perpendicular to the first axis; and a lower coupler configured to couple the angle selection unit to an electrically insulated pole;

wherein the angular adjustment mechanism is out of the path to pass ground fault current from the electrical conductor to the associated ground conductor coupled to the ground conductor connector.

14. The angular adjustment mechanism according to claim 13, wherein the upper rotational coupler includes a rotational lock configured to lock the clamping mechanism in a selected position around the second axis.

15. The angular adjustment mechanism according to claim 13, wherein the angular adjustment mechanism comprises a gear box and associated gears to provide the angular adjustment between the clamping mechanism and the insulated pole in the first axis while also transferring force to actuate the actuatable clamp.

16. The angular adjustment mechanism according to claim 13, wherein the angular adjustment mechanism comprises at least one universal joint to provide the transfer of force to actuate the actuatable clamp.

17. The angular adjustment mechanism according to claim 13, wherein the angular adjustment mechanism comprises a hydraulic actuator to provide the transfer of force to actuate the actuatable clamp.

18. A method of making a grounding clamp system for use with an electrically insulated pole and for attachment to an electrical conductor in angled configurations, the method comprising:

providing a clamping mechanism including an actuatable clamp having an actuator and an associated ground conductor connector, the actuatable clamp includes a moveable clamp member being actuatable in a direction along an actuating axis to selectively tighten and loosen the clamping mechanism on the electrical conductor;

providing an attachment coupler configured to attach to the electrically insulated pole; and rotationally coupling an angular adjustment mechanism between the clamping mechanism and the attachment coupler, the angular adjustment mechanism configured to provide angular adjustment between the clamping mechanism and the attachment coupler in at least one angular adjustment axis that is transverse to the actuating axis, while also transferring force to actuate the actuatable clamp in the direction along the actuating axis when attaching the clamping mechanism to the electrical conductor at a selected angular position;

wherein the clamping mechanism is configured to create a path to pass ground fault current from the electrical conductor to a ground conductor coupled to the associated ground conductor connector without including the angular adjustment mechanism in the path.

19. The method according to claim 18, wherein the actuator comprises a threaded shaft; wherein the actuatable clamp comprises a clamp body defining an upper jaw, and carrying the moveable clamp member as a movable lower jaw coupled to the threaded shaft; and wherein the threaded shaft is positioned within the clamp body.

20. The method according to claim 18, wherein the angular adjustment mechanism comprises a gear box and associated gears to provide the angular adjustment between the clamping mechanism and the attachment coupler in the at least one axis while also transferring force to actuate the actuatable clamp.

* * * * *